Figure 1:
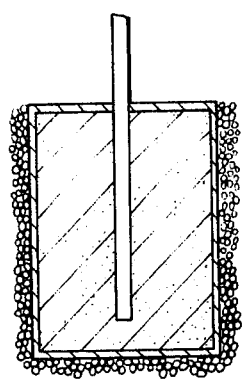

United States Patent [19]

Nishino et al.

[11] 4,148,131

[45] Apr. 10, 1979

[54] METHOD FOR MANUFACTURING A SOLID ELECTROLYTIC CAPACITOR

[75] Inventors: Atsushi Nishino, Neyagawa; Hayashi Hayakawa, Kadoma; Akihiko Yoshida, Sakai, all of Japan

[73] Assignee: Matsushita Electric Industrial Co., Ltd., Osaka, Japan

[21] Appl. No.: 855,200

[22] Filed: Nov. 28, 1977

Related U.S. Application Data

[62] Division of Ser. No. 689,661, May 24, 1976, abandoned.

[30] Foreign Application Priority Data

Nov. 27, 1975 [JP] Japan .................. 50-143137
Mar. 19, 1976 [JP] Japan .................. 51-30175

[51] Int. Cl.² .............................................. H01G 9/05
[52] U.S. Cl. .................. 29/570; 204/38 A; 427/80
[58] Field of Search ............ 204/38 A, 37 R; 29/570; 428/469; 427/80; 361/322

[56] References Cited

U.S. PATENT DOCUMENTS

| | | | |
|---|---|---|---|
| 3,093,883 | 6/1963 | Haring et al. | 204/38 A X |
| 3,279,030 | 10/1966 | Wagner et al. | 204/38 A X |
| 3,473,092 | 10/1969 | Silgailis | 29/570 X |
| 3,538,395 | 11/1970 | Riley | 29/570 X |

FOREIGN PATENT DOCUMENTS 892300  3/1962  United Kingdom .................. 204/38 A

*Primary Examiner*—G. L. Kaplan
*Attorney, Agent, or Firm*—Spencer & Kaye

[57] ABSTRACT

A solid electrolytic capacitor comprises an anode body made of a valve action metal the surface of which is coated with an anodically oxidized film, a manganese oxide layer formed thereon through repeatedly dipping, into a high viscosity slurry of manganese oxide producing solution consisting of $Mn(NO_3)_2$—$Mn(CH)_2$—$NH_4$-$NO_3$—$H_2O$ followed by thermal decomposition, and a cathode layer formed thereon. Through the improvement of said solution a required amount of uniform and dense manganese oxide layer is produced with a minimum number of repetitions of the above process so that a solid electrolytic capacitor having an improved characteristic can be provided.

3 Claims, 12 Drawing Figures

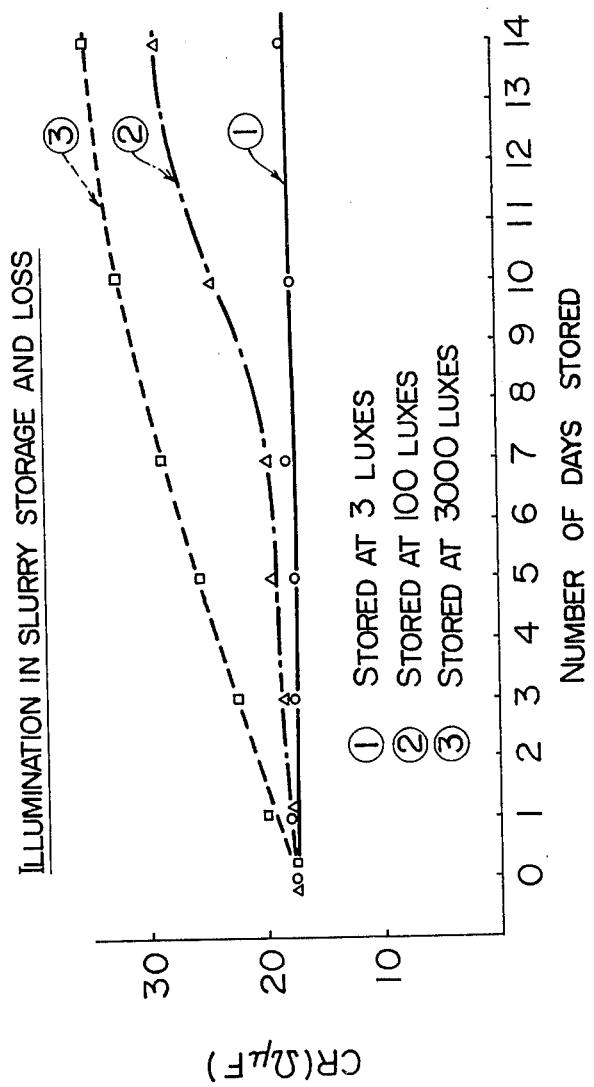

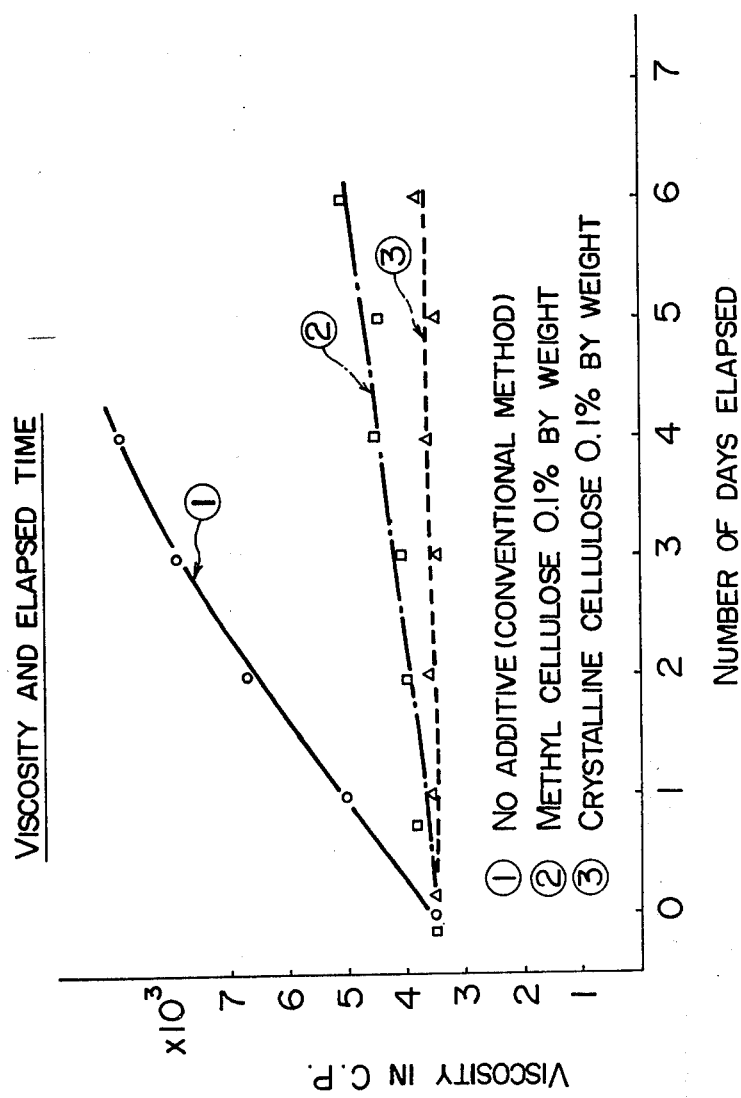

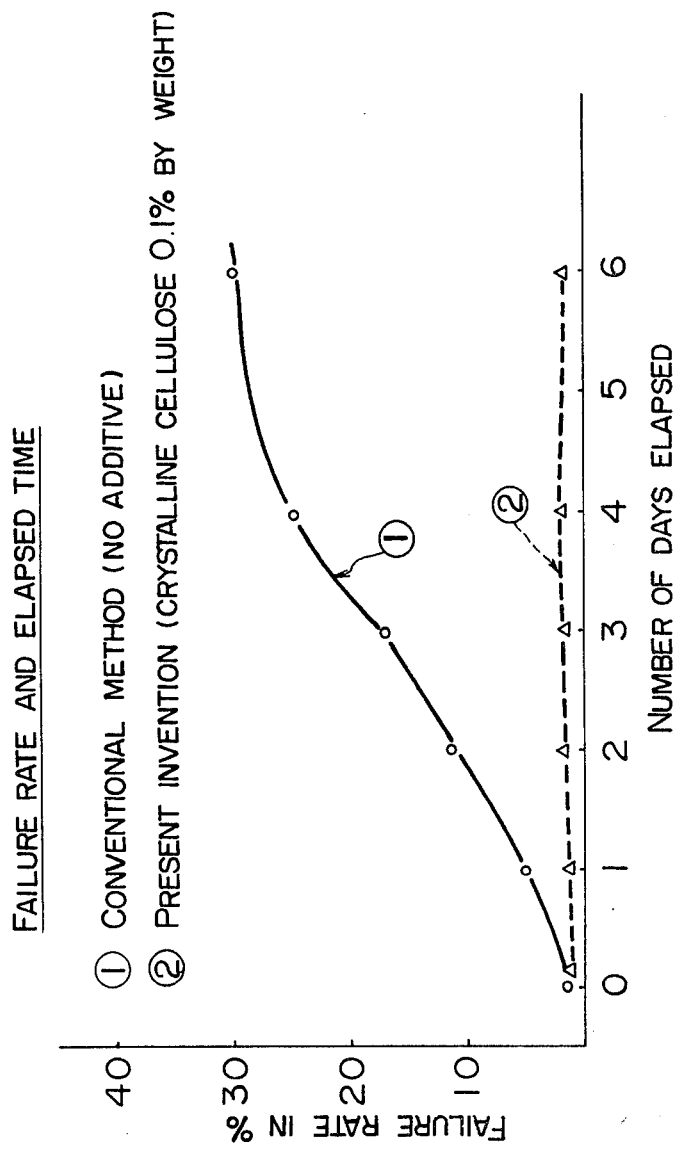

METHOD FOR MANUFACTURING A SOLID ELECTROLYTIC CAPACITOR

This is a division of application Ser. No. 689,661 filed May 24, 1976 and now abandoned.

The present invention relates to a solid electrolytic capacitor and more particularly to a solid electrolytic capacitor having an improved characteristic in which a required amount of a uniform and dense manganese oxide layer can be produced with a minimum number of repetitions of dipping and thermal decomposition by use of an improved semiconductive manganese oxide producing solution.

More specifically, the present invention uses a solution in the form of a slurry comprising manganese nitrate solution and manganese hydroxide suspended therein, instead of conventional manganese nitrate solution, as a manganese oxide producing solution. This solution is repeatedly applied to an anode body by dipping and then subjected to thermal decomposition so that a required amount of uniform and dense manganese oxide layer can be produced with a minimum number of repetition of dipping and thermal decomposition, whereby characteristics such as loss, leak current and impedance characteristic can be improved.

In the past, a solid electrolytic capacitor has been manufactured by preparing a porous anode body made of a valve action metal such as tantalum on which an anodically oxidized film which is a dielectric film has been formed, dipping the anodic body into a manganese oxide producing solution such as manganese nitrate solution followed by thermal decomposition to produce a manganese oxide having a semiconductive property, and forming a cathode layer and a conductive layer on the manganese oxide layer.

However, as the size of the anode body of the valve action metal becomes larger, the dipping and thermal decomposition process has to be repeated a number of times to form the manganese oxide layer in order to obtain the required characteristics. In this case, it has been difficult to obtain a uniform and dense manganese oxide layer, as shown in FIG. 1. Moreover, through the repetition of the dipping and thermal decomposition process, the anodically oxidized film formed on the anode body has been deteriorated by heat and the performance has also deteriorated resulting in an increase of loss and leakage current and poor impedance characteristic.

To overcome the above difficulty, it has been proposed to increase the number of repetitions of the dipping and thermal decomposition process while using a low concentration of manganese nitrate solution, or to rotate the anode body vertically and laterally during the thermal decomposition to obtain a uniform manganese oxide layer.

However, the increased number of repetitions of the thermal decomposition has resulted in an increase of loss, a decrease of breakdown voltage, an increase of the manufacturing steps and hence an increase in cost.

The rotation of the anode body vertically and laterally during the thermal decomposition has resulted in the complexity of the thermal decomposition process and treatment and hence an increase of cost.

It is an object of the present invention to overcome the above difficulties encountered in the prior art manganese oxide layer and to provide a solid electrolytic capacitor having a novel highly active manganese oxide layer.

According to the present invention, a novel manganese oxide layer is prepared through the dipping and thermal decomposition process with a solution basically consisting of manganese nitrate, manganese hydroxide, ammonium nitrate and water.

Figure 2:
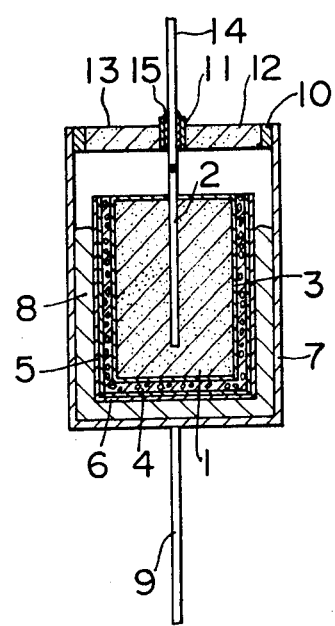
Figure 3:
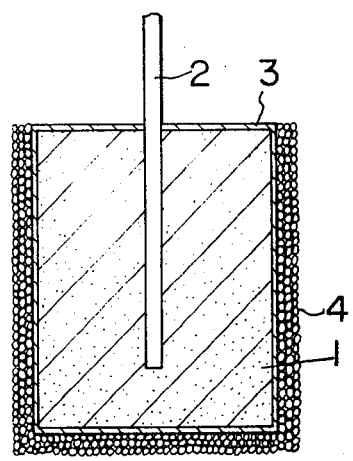
Figure 4:
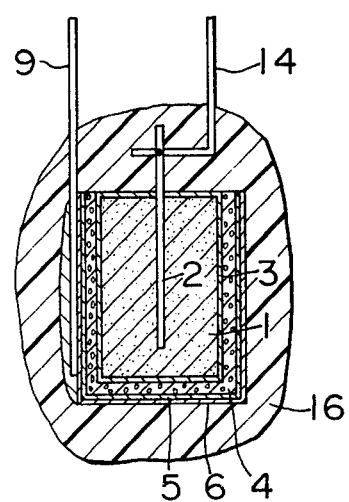
Figure 5:
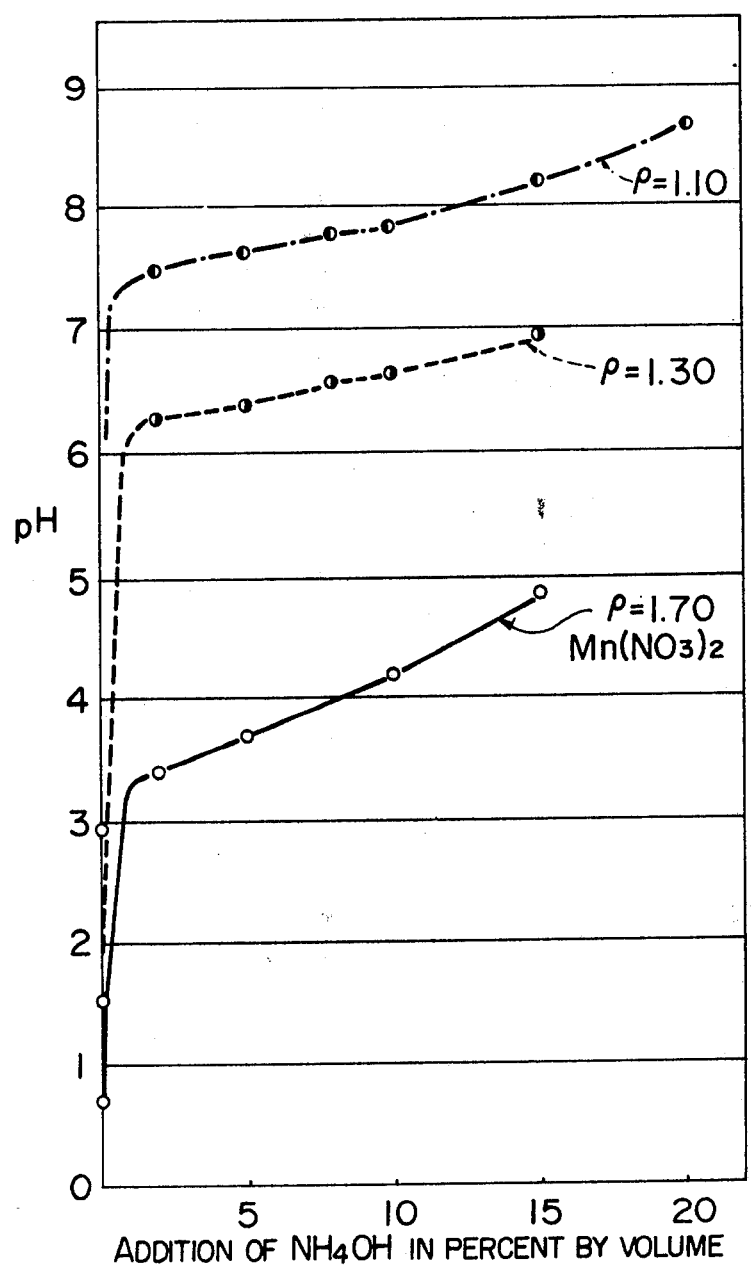
Figure 6:
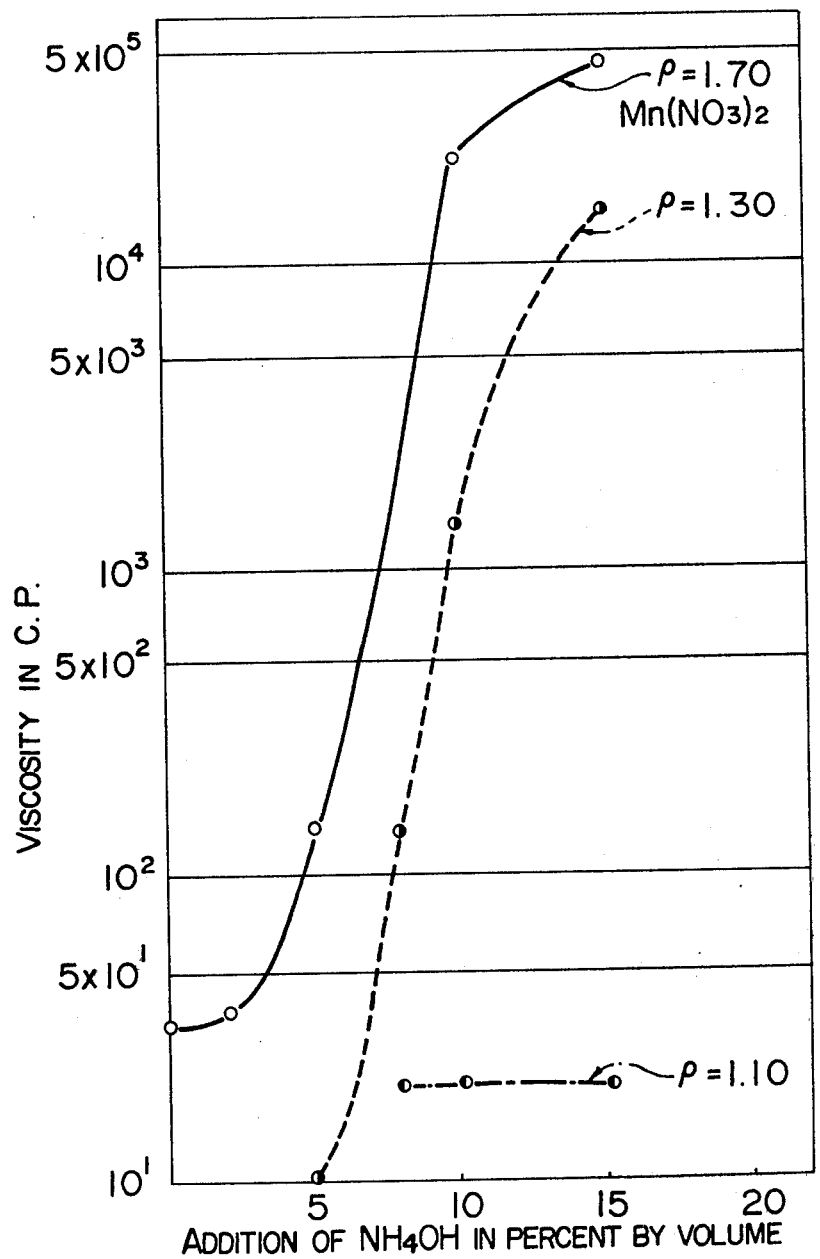
Figure 7:
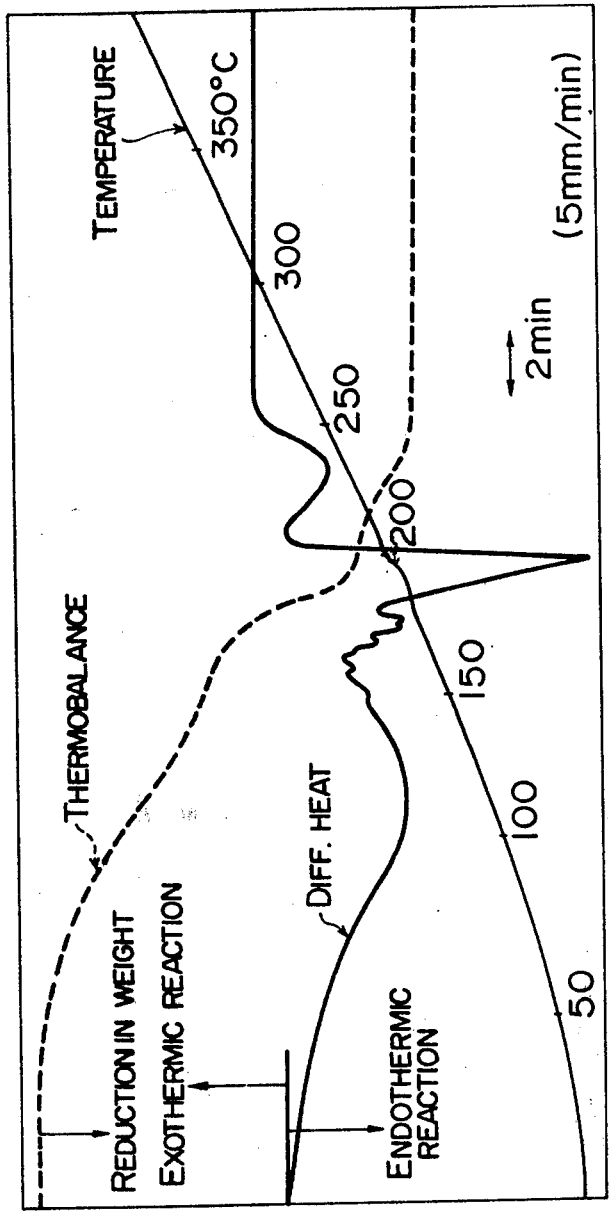
Figure 8:
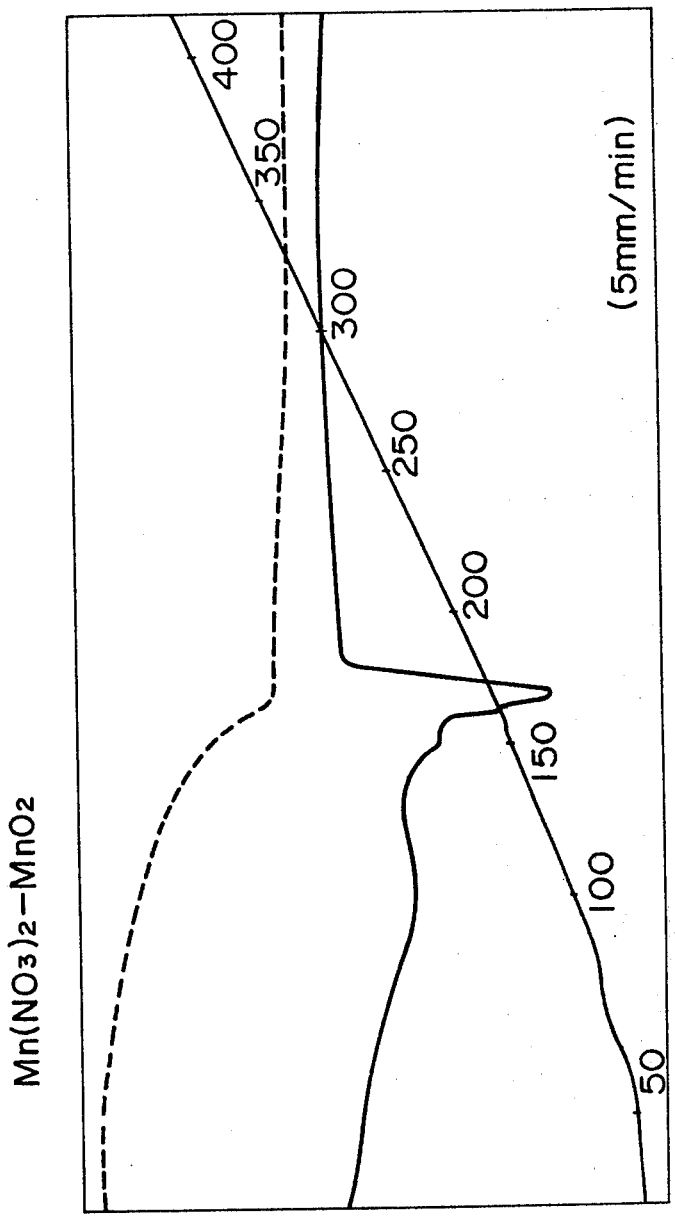
Figure 9:
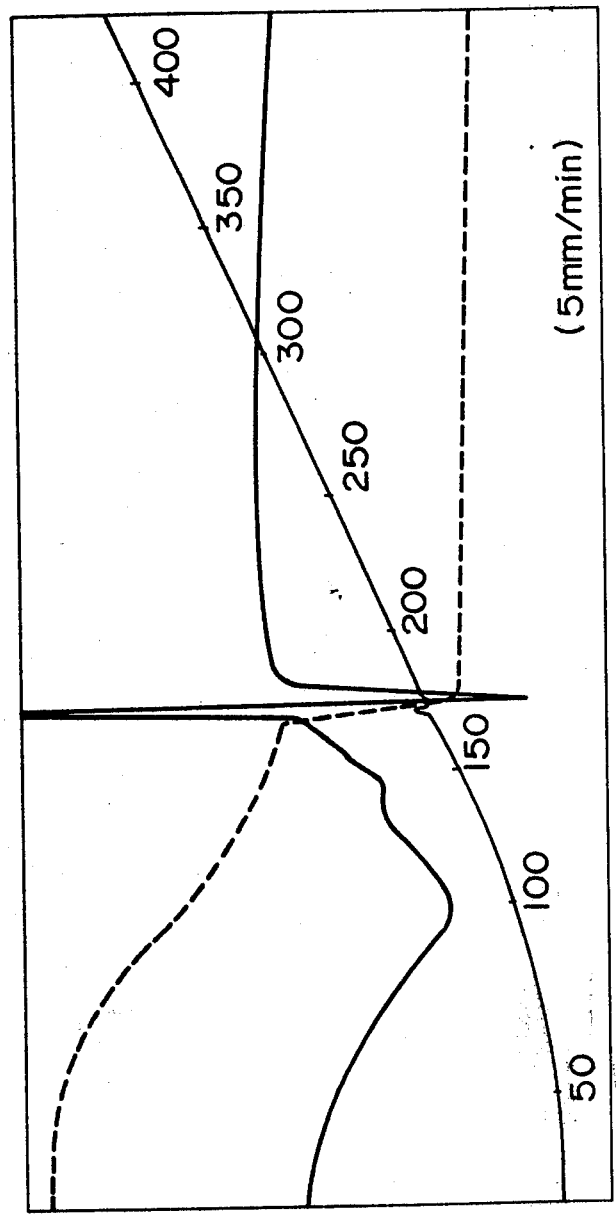

The above and other objects, features and advantages of the present invention will become more apparent from the following description of the preferred embodiment of the invention when taken in conjunction with the accompanying drawings, in which:

FIG. 1 is a sectional view showing a manganese oxide layer of a prior art solid electrolytic capacitor, FIG. 2 is a sectional view showing one embodiment of a solid electrolytic capacitor of the present invention, FIG. 3 is a sectional view of a main part thereof, FIG. 4 is a sectional view showing other embodiment of the solid electrolytic capacitor, FIG. 5 shows a relation between the amount of ammonium hydroxide added to manganese nitrate solution and a resulting change of pH, FIG. 6 shows the change of viscosity in FIG. 5, FIG. 7 shows differential heat-thermobalance analysis characteristic for $Mn(NO_3)_2$, FIG. 8 shows differential heat-thermobalance analysis characteristic for $Mn(NO_3)_2$—$MnO_2$, FIG. 9 shows differential heat-thermobalance analysis characteristic for $Mn(NO_3)_2$—$Mn(OH)_2$—$NH_4NO_3$—$H_2O$.

FIG. 10 shows characteristics of preservation illumination and loss of a manganese oxide producing solution, FIG. 11 shows a relation between the viscosity and the number of days elapsed, FIG. 12 shows a relation between a failure rate and the number of days elapsed.

One embodiment of the present invention will now be described with reference to the drawings.

FIG. 2 shows a metal case type capacitor, in which 1 designates a porous anode body formed by sintering particles of a valve action metal such as tantalum, niobium or aluminum. An anode internal lead 2 of the same valve action metal is embedded in the anode body 1. An anodic oxidation coating 3 is formed on the surface of the anode body 1 by the anodic oxidation, which coating 3 acts as a dielectric material to determine the capacitance of the capacitor. On the anodic oxidation coating 3, manganese oxide producing solution basically consisting of $Mn(NO_3)_2$—$Mn(OH)_2$—$NH_4NO_3$—$H_2O$ is applied followed by thermal decomposition thereof to produce a large amount of a uniform and dense manganese oxide layer 4 having a semiconductive property, as shown in FIG. 3. On the manganese oxide layer 4, a cathode layer 5 such as carbon is provided, and a conductive layer 6 such as silver paint is formed thereon. A capacitor element thus constructed is accommodated in a metal casing 7 with solder 8 being interleaved therebetween to electrically connect the cathode layer 5 with the metal casing 7. A cathode lead 9 is connected to the bottom of the metal casing 7 and an opening of the metal casing 7 is sealed by a seal body 13 having a metal ring 10 along an outer periphery thereof and a center metal pipe 11 to serve as a guide for a lead and an insulating layer 12 of glass or ceramic extending between the metal ring 10 and the center metal pipe 11. Fitted to the metal pipe 11 of the seal body 13 is an anode lead 14 made of solderable metal wire having its tip end connected to the anode internal lead 2 by welding or the like. Sealing solder 15 is charged in a clearance between the anode lead 14 and the metal pipe 11.

FIG. 4 shows a resin mold type capacitor, in which a cathode lead 9 is connected to an outer periphery of the capacitor element similar to that shown in FIG. 2, and an anode lead 14 is connected to the anode internal lead 2. The assembly is then dipped into a liquid resin and the resin is then dried and cured to form the resin mold 16.

In the solid electrolytic capacitors of the types described above, the manganese oxide producing solution for producing a thick, uniform and dense manganese oxide layer 4 is prepared in the following manner.

In a first example, ammonium hydroxide of an appropriate concentration is added to manganese nitrate solution of a desired concentration with agitation and the mixture is suspended to a sufficient degree using a colloid stabilizer which stabilizes the colloid of manganese hydroxide, to produce a manganese oxide producing solution of $Mn(NO_3)_2$—$Mn(OH)_2$—$NH_4NO_3$—$H_2O$ having a desired viscosity.

In a second example, separately prepared manganese hydroxide and ammonium nitrate are added to manganese nitrate solution of a desired concentration with agitation, or $Mn(NO_3)_2$, $Mn(OH)_2$, $NH_4NO_3$ and $H_2O$ are fully dispersed and suspended using an emulsifying agent to prepare a suspension of manganese hydroxide with a pH thereof being properly adjusted.

FIG. 5 shows the correlation of pH of a suspension prepared by adding 28% by weight of ammonium hydroxide to manganese nitrate solutions having specific gravities of 1.10, 1.30 and 1.70, with agitation, and the amount (% by volume) of ammonium hydroxide added. The reaction in this case is:

$$Mn(NO_3)_2 + 2NH_4OH \rightarrow Mn(OH)_2 + 2NH_4NO_3 \ldots \quad (1)$$

FIG. 6 shows the correlation of the viscosity of the solution in the reaction of the formula (1) and the amount (% by volume) of ammonium hydroxide.

The above reaction is explained in detail. Manganese nitrate having a specific gravity of 1.70 is first considered. When NH$_4$OH in the amount of 28% by weight is added to the manganese nitrate solution having a minus pH value, the pH suddenly rises to about 3.3 when the percent of NH$_4$OH reaches around 0.3% as shown in FIG. 5. At this point, in an early state of the addition of aqueous ammonia, the suspension turns somewhat brown by the generation of magnetite, but as the aqueous ammonia is continuously added, manganese hydroxide is produced in the solution so that the suspension turns white or cream-color because manganese hydroxide is suspended in an amount proportional to the amount of addition of aqueous ammonia.

The changes in pH and viscosity of the solution in this process are shown in FIGS. 5 and 6. The viscosity for the solution having more than 15% by volume of 28% by weight of NH$_4$OH is not shown because measurement thereof is difficult and inaccurate due to the increase of viscosity. The numerical values in FIGS. 5 and 6 show the specific gravities of the manganese nitrate solution.

As the investigation proceeded, it has been found by the inventors that the emulsion prepared in this manner involved the following problem and the present invention is intended to provide a solution therefor. The problem and solution are explained below. The problem is the instability of the emulsion prepared in the above manner.

The instability includes the change in color and the change in viscosity.

As to the change in color, it has been found that the white or light cream-colored emulsion turned to light brown or brown with the elapse of time after the preparation. This is caused because manganese hydroxide which is present in the emulsion is oxidized into a low class oxide of manganese. Manganese hydroxide is generally a very unstable material and it is further unstable because it is present in manganese nitrate as colloid particles and it changes to low class oxide of manganese with the elapse of time, which exhibits a brown color. It has been found that this affects the characteristics of the capacitor and hence poses a problem from the standpoint of both quality control and process control.

The inventors studied the causes thereof in detail and found a solution therefor.

Namely, it has been found that the change in color occured because manganese hydroxide which is present in manganese nitrate was extremely sensitive to light and photochemical oxidation reaction was caused due to oxygen dissolved in the solution and light.

After the analysis and study on the light sensitive phenomenon of manganese hydroxide, it has been found that it was very stable for an extended period without any change of color when it was stored in a dark state.

The second problem is the instability of viscosity. The instability means that the viscosity changes with time even if the emulsion was initially prepared to have a predetermined viscosity. This occurs because colloid particles of manganese hydroxide dispersed in the manganese nitrate solution associate with each other with the elapse of time and aggregate.

That is, the colloidal particles formed at the early state of the preparation or so-called primary particles aggregate with the elapse of time to form secondary particles. In this manner, the stability of the system is lost and the viscosity changes. Generally, in this case, the viscosity increases.

It has been found that when the viscosity changes with time after the preparation thereof, this significantly influences the performance of the capacitor as described below. Particularly, it causes variance in the amount of deposition of slurry on the capacitor element when the latter is dipped in the slurry solution and removed therefrom. This, of course, causes a variance in the amount of deposition of manganese oxide after thermal decomposition. It has been found that this considerably affected the performance of the capacitor and adversely affected the process control.

After the analysis and study on the causes of the above change of viscosity, the inventors have found that the viscosity was stabilized by the addition of a certain amount of an emulsification stabilizing agent.

The features of the present invention will be clarified by the phenomenon described below.

One of the feature is a pyrolysis or thermal decomposition reaction. This is explained below. The prior art pyrolysis reaction for manganese nitrate proceeded in the following manner:

$$MN(NO_3)_2 \cdot XH_2O \rightarrow MnO_2 + 2NO_2 \uparrow + XH_2O \uparrow \ldots \quad (2)$$

On the other hand, it has been proved that the pyrolysis reaction for the suspension in the form of slurry of the present invention proceeded in the following manner:

Basic composition:

$Mn(NO_3)_2 \cdot Mn(OH)_2 \cdot NH_4NO_3 \cdot H_2O$ system $$2NH_4NO_3 \rightarrow 2NH_3 \uparrow + 2HNO_3 \ldots \quad (3)$$

$$Mn(OH)_2 + 2HNO_3 \rightarrow Mn(NO_3)_2 + 2H_2O \uparrow \ldots \quad (4)$$

$$Mn(OH)_2 \cdot XH_2O \rightarrow MnO_2 + 2NO_2 \uparrow + XH_2O \uparrow \ldots \quad (5)$$

The above reactions were analyzed by differential heat-thermobalance analysis. The results thereof are shown in FIGS. 7, 8 and 9.

FIG. 7 shows the result of differential heat-thermobalance analysis for the manganese nitrate solution having specific gravity of 1.70. FIG. 8 shows a comparative example in which manganese dioxide was suspended in the amount of 10% by weight in manganese nitrate having specific gravity of 1.70. FIG. 9 shows an example in accordance with the present invention in which slurry consisting of manganese nitrate, manganese hydroxide, ammonium nitrate and water was used. Manganese nitrate had specific gravity of 1.70, and 28% ammonium hydroxide was added thereto in the amount of 10% by weight and emulsified therewith.

It is seen from the analysis results of FIGS. 7 to 9 that an endothermic reaction occurs in the solution of the prior art comprising manganese nitrate or manganese nitrate and manganese dioxide suspended therein, while an exothermic reaction occurs in the suspension of the present invention of FIG. 9 prior to the pyrolysis reaction (endothermic reaction) of manganese nitrate. This is one of the important features of the present invention.

When the slurry suspension of $Mn(NO_3)_2$—$Mn(OH)_2$—$NH_4NO_3$—$H_2O$ is pyrolyzed on the surface of the anode body, ammonium nitrate is vaporized as ammonia gas in an early phase with pH of the suspension decreasing with the generation of the ammonia gas. This corresponds to the reaction formula (3) generating nitric acid. The suspension is concentrated and the suspended particles of manganese hydroxide are again dissolved in this phase. This corresponds to the formula (4). This reaction is extremely exothermic reaction. Thereafter the pyrolysis reaction (endothermic reaction) of manganese nitrate occurs. A portion of $Mn(OH)_2$ is directly oxidized by the concentrated nitric acid at a high temperature to produce manganese oxide.

As a result, according to the present invention, uniform and dense manganese oxide is deposited by pyrolysis in spite of the suspension of manganese hydroxide. In addition, a large amount of manganese dioxide can be formed in one process because a high viscosity slurry is used.

Heretofore, it has been proposed to use the solution of manganese nitrate to which powders of manganese dioxide or manganese carbonate were added. However, the manganese oxide deposited by pyrolysis apparently exhibited the existence of heterogeneous particles, and the deposited manganese oxide was fragile. As a result, the resulting capacitor, although it had an improved leakage current characteristic, showed poor loss characteristic and poor humidity resistance property.

Particular examples together with characteristics thereof are given below:

EXAMPLE 1

An anode body made of sintered tantalum having weight of 3 g was anodically oxidized in 0.05% by weight citric acid at a room temperature for three hours at 70 volts to form an anodic oxidation film thereon. Thereafter, it was subjected to pyrolysis at 280° C. five times using $Mn(NO_3)_2$ solution having specific gravity of 1.30. Then, using the slurry suspension of the present invention, the slurry suspension was applied and impregnated on the surface of the anode body and it was subjected to pyrolysis at 280° C. three times. The eight repetitions of the above pyrolyses were conducted in only one direction. For the purpose of comparison, eight repetitions of pyrolyses were conducted using $Mn(NO_3)_2$ solution having specific gravity of 1.30 as a conventional method, followed by five repetitions of pyrolysis with an $Mn(NO_3)_2$ solution of 1.70 specific gravity, with and without rotation of the anode body during the pyrolysis. The results thereof are shown in Tables 1 and 2. The repetitions of pyrolyses means the number of pyrolysis cycles each consisting of a dipping-pyrolysis-rinse in hot water-recovery of film-drying, which cycle is repeated.

Table 1

| | Comparison of Number of Times of Pyrolyses | | |
|---|---|---|---|
| | Number of Repetitions of Pyrolyses | | State of Pyrolysis |
| Present Invention | ①② ③④⑤ $Mn(NO_3)_2$ $\rho = 1.30$ | ⑥⑦ ⑧ Slurry of present invention | Only one direction |
| Comparative | ①②③④ ⑤⑥⑦ $Mn(NO_3)_2$ $\rho = 1.30$ | ⑧⑨⑩⑪⑫ $\rho = 1.70$ | Four direction |
| Example 1 | | | |
| Comparative Example 2 | ①②③④⑤⑥⑦ $Mn(NO_3)_2$ $\rho = 1.30$ | ⑧⑨⑩⑪⑫ $\rho = 1.70$ | Only one direction | the pyrolysis reaction (endothermic reaction) of manga-

Table 2

| | Experiment Results I | | | | |
|---|---|---|---|---|---|
| | Number of repetitions of pyrolyses | State of pyrolysis | Accomplishment rate for capacitance | tan δ | L.C. measured after application of 20 volts for 5 minutes |
| Present Invention | 8 | one direction | 98% | 2% | 0.1 μA |

Table 2-continued

|  | Experiment Results I | | | | |
|---|---|---|---|---|---|
|  | Number of repetitions of pyrolyses | State of pyrolysis | Accomplishment rate for capacitance | tan δ | L.C. measured after application of 20 volts for 5 minutes |
| Comparative Example 1 | 12 | four directions | 98% | 3% | 0.2 μA |
| Comparative Example 2 | 12 | one direction | 98% | 4.5% | 0.5 μA |

As described above, the prior art manganese oxide result in a capacitor having a large leakage current, in order to overcome the above defect particularly for a large size capacitor, the capacitor element had to be rotated during the pyrolysis, which in turn resulted in high manufacturing cost and yet unsatisfactory performance.

On the contrary, when the slurry solution of the suspension of $Mn(NO_3)_2$—$Mn(OH)_2$—$NH_4NO_3$—$H_2O$ is used in accordance with the present invention, which slurry is applied and impregnated to the surface of the anode body, which is thereafter subjected to pyrolysis, the number of repetitions of the pyrolyses can be reduced by the factor of two, the characteristics of the capacitor are remarkably improved and an initial quality is kept for a long time.

The slurry used in the present example was prepared under the following conditions.

28% $NH_4OH$ in the amount of 8% by weight was added to a manganese nitrate solution of 1.70 specific gravity to form a suspension. The pH was 3.7 and the viscosity was 2500 cp. The viscosity of the manganese nitrate solution of 1.70 specific gravity was 70.

EXAMPLE II

An anode body made of a small, square sintered sample of tantalum having a weight of 50 mg was anodically oxidized in 0.05% by weight citric acid solution at room temperature for three hours at 70 volts to form an anode oxidation film thereon. Thereafter, using the slurry suspension of the present invention, the slurry suspension was applied and impregnated to the surface of the anode body followed by three times of pyrolysis. for the purpose of comparison, a manganese nitrate solution of 1.30 specific gravity was used as a conventional example together with four repetitions of pyrolyses followed by two repetitions of pyrolyses with manganese solution of 1.60 specific gravity. The comparison of those results is shown in Table 3. The pyrolyses were all conducted in only one direction.

Table 3

|  | Experiment Results II | | | | |
|---|---|---|---|---|---|
|  | Number of repetitions of pyrolyses | | Accomplishment rate of capacitance | tan δ | L.C. measured after application of 20 volts for 3 minutes |
| Present invention | ① ② ③ Slurry of present invention | | 100% | 0.8% | 0.005 μA |
| Comparative Example | ① ② ③ ④ $Mn(NO_3)_2$ ρ = 1.30 | ⑤ ⑥ ρ = 1.60 | 100% | 1.5% | 0.01 μA |

As described above, it has been proved that for a small and thin capacitor a satisfactory performance can be attained solely by the suspension of the present invention without need for using the manganese nitrate solution. It has also been proved that, like in the case of a large size capacitor element, because of its high viscosity, the use of the suspension of the present invention could reduce the required number of repetitions of the pyrolyses because the amount of deposition after dipping was large.

Moreover, it has been found that because of the characteristic pyrolysis reaction mentioned above, manganese dioxide deposited uniformly and firmly so that the leakage current (L.C.) characteristic and the loss (tan δ) characteristic were remarkably improved.

In the Example II, the suspension was prepared by adding 28% $NH_4OH$ in the amount of 5% by weight to the manganese nitrate solution having specific gravity of 1.60. The pH was 3.4 and the viscosity was 1200 CP.

EXAMPLE III

An anode body made of a large size sintered sample of tantalum having the weight of 3 g was anodically oxidized in a 0.05% citric acid solution at a room temperature for three hours at 70 volts to form an anode oxidation film thereon. Thereafter, it was subjected to pyrolysis five times, with manganese nitrate solution having a specific gravity of 1.30 at 280° C. Then, using the slurry suspension of the present invention, the slurry suspension was applied and impregnated to the surface of the anode body. Thereafter, it was subjected to so-called two-step pyrolysis at 130° C. for ten minutes followed by 280° C. for ten minutes. The results thereof are compared below with the method of the Example I.

Table 4

| | Condition of pyrolysis of suspension | Number of repetitions of pyrolyses | | Accomplishment rate for capacitance | tan δ | L.C. measured after application of 20 volts for 5 minutes |
|---|---|---|---|---|---|---|
| Two-step pyrolysis | 130° C.–280° C. 10 min. 10 min. | ① ② ③ ④ ⑤ Mn(NO₃)₂ ρ = 1.30 | ⑥ Slurry of present invention | 98% | 2% | 0.08– 0.1 μA |
| One-step pyrolysis Example I-1 | 280° C. 10 min. | ① ② ③ ④ ⑤ Mn(NO₃)₂ ρ = 1.30 | ⑥ ⑦ ⑧ Slurry of present invention | 98% | 2% | 0.1 μA |

The pyrolyses were all conducted in one direction. The slurry suspension used in the present Example was prepared under the same condition as the Example I.

It has been found that when the pyrolysis with the slurry suspension of the present invention was carried out by the two-step process, the deposition of manganese oxide was very satisfactory and it considerably contributed to the reduction of the number of repetitions of pyrolyses and the stabilization of the performance.

This is because the manganese oxide forming solution deposited to the anode body does not fall as the pyrolysis reaction proceeds when the temperature is raised stepwise. Particularly, because of high viscosity the slurry suspension of the present invention is heavily deposited much so that it is more influenced. Accordingly, when the pyrolysis with the slurry suspension is conducted with stepwise temperature rise, a very large amount of manganese dioxide can be uniformly deposited and the number of repetitions of the pyrolyses can be reduced, resulting in a reduction of cost, stabilization of the performance and the improvement of leakage current (L.C.) characteristic.

EXAMPLE IV

Particular example of the measurement of light sensitivity of manganese hydroxide and the results thereof are now explained.

0.8% ammonium hydroxide solution was added in the amount of 10% by volume to a manganese nitrate solution having a specific gravity of 1.70 to form a slurry suspension. Thereafter, the samples taken therefrom were left at locations of present illuminations, at a room temperature. The relations between the time elapsed and the change of color by photochemical reaction by light were observed. The results thereof are shown in Table 5.

Table 5

| | Illuminations and Periods and Changes of Color | | | | | |
|---|---|---|---|---|---|---|
| Illumination (Lux) | Period (Hours) 0.5 H | 3 H | 10 H | 30 H | 100 H | 300 H |
| 1  5000 | Brown Color change Very light brown | " Brown | " | " | " | " |
| 2  1000 | Slight color change Pink | Color change Pink | " Very light brown | " Light Brown | " Brown | " |
| 3  500 | No color change Pink | No color change Pink | Slight color change Pink | Color change Very light brown | Color change Light brown | Brown |
| 4  100 | No color change Pink | No color change Pink | No color change Pink | slight color change Pink | Color change pink | Color change Very light brown |
| 5  10 | No color change Pink | No color change Pink | No color change Pink | No color change Pink | No color change Pink | Slight color change Pink |
| 6  1 | No color change | No color change | No color change | No color change | No color change | No color change |

As seen from the Table 5, it has been found that when the sample was left under the illumination of 5000 luxes, it was subjected to violent photochemical oxidation reaction to change the pink suspension to brown in 0.5 hours. When the illumination was at 1000 luxes, it turned to brown in three hours which was longer than the time for 5000 luxes illumination. In a similar way, it was found that as the illumination decreased the time required to be turned brown was extended exponentially.

Considering the results of the Table 5 from the industrial standpoint, the illumination of more than 1000 luxes is not desirable since the change of color to brown occurs in three hours. When the illumination is less than 500 luxes, the color changes only to very light brown in the hours. Assuming that work time in a day is 8 hours, there is no practical problem.

As seen from the above, it has been found in the present invention that the colloidal material of manganese hydroxide had a very high light sensitivity. After having analyzed the colloidal material of manganese hydroxide which was an unstable element of the slurry suspension of $Mn(NO_3)_2$—$Mn(OH)_2$—$NH_4NO_3$—$H_2O$, and the relation of the illumination to the change of the material by the photochemical oxidation reaction was considered to determine practical illumination from an industrial standpoint.

The influences to particular characteristics are given below.

EXAMPLE V

An anode body made of sintered tantalum having the weight of 3 g was anodically oxidized in 0.05% by weight citric acid at a room temperature for three hours at 70 volts to form an anodic oxidation film thereon. It was then subjected to a repeated pyrolysis five times at 280° C. with manganese nitrate solution having specific gravity of 1.30, followed by three repetitions of pyrolyses with the slurry suspension of the present invention (the suspension of $Mn(NO_3)_2$ solution having specific gravity of 1.70 to which 28% $NH_4OH$ was added in the amount of 10% by volume). The slurry suspension at this state, which had been stored in a conventional manner was compared with the slurry suspension which had been stored under reduced illumination in accordance with the present invention. The change of the loss is shown in FIG. 10.

Thus, practical advantage as well as improvement in the performance have been proved.

EXAMPLE VI

Colloid stabilizing agent is now discussed specifically.

28% ammonium hydroxide in the amount of 10% by volume was added to manganese nitrate solution having a specific gravity of 1.70 to form a slurry suspension. The sample was then left in a constant temperature oven maintained at 30° C. and the relation of viscosity to elapsed time was measured. The result thereof is shown in FIG. 11, in which typical ones of the colloid stabilizing agents used in the present experiment which exhibited a remarkable effect are shown.

The colloid stabilizing agents considered are P.V.A. (polyvinyl alcohol), C.M.C. (carboxymethyl cellulose), starch, gum arabic, sodium alginate, polyethylene oxide, etc. Of those, crystalline cellulose and methyl cellulose showed the most remarkble effect. Other colloid stabilizing agents such as P.V.A. or C.M.C. which is a fiber element derivative material showed relatively satisfactory result.

Characteristics of a capacitor element manufactured using the slurry of the present invention is now described.

EXAMPLE VII

An anode body made of sintered tantalum having a weight of 3 g was anodically oxidized in 0.05% by weight citric acid for three hours at 70 volts to form an anode oxidation film thereon. Then it was subjected to five repetitions of pyrolyses at 250° C. with manganese nitrate solution having specific gravity of 1.30, followed by three repetitions of pyrolyses at 250° C. with the slurry suspension of the present invention (under the same condition as the Example IV). The slurry at this stage without any addition as in a conventional manner was compared with that to which 0.1% by weight of crystalline cellulose was added. A remarkable effect in the reduction of failure rate was observed. The result thereof is shown in FIG. 12.

While an optimum concentration of manganese nitrate used in the present invention should be determined by the particular type, shape and weight, it is preferable that manganese nitrate has a specific gravity of more than 1.30 because the increase of viscosity is extremely small when the specific gravity is below 1.30.

Furthermore, more effect of the present invention will be attained when the viscosity is more than 500 cp.

While the present invention has been explained mainly of the examples using anode body made of sintered tantalum, it should be understood that the present invention is equally applicable to a tantalum plate, sputtered or evaporated thin film, or implanted anode body.

What is claimed is:

1. A method for manufacturing a solid electrolytic capacitor comprising the steps of:
   forming an anodically oxidized coating by anodic oxidation on a surface of an anode body made of a sintered porous body of a valve action metal selected from the group consisting of tantalum, aluminum, and niobium,
   filling manganese dioxide in the pores of said sintered body by thermal decomposition of an aqueous solution of manganese nitrate,
   dipping said anode body in a thermally decomposing, manganese oxide-forming solution of a $Mn(NO_3)_2$—$Mn(OH)_2$—$NH_4NO_3$—$H_2O$ system having a viscosity of not less than 500 cp to deposit said solution on the outer surface of said sintered body,
   thermally decomposing said solution to form a large amount of a fine and uniform manganese oxide layer, and
   forming a cathode layer on said manganese oxide layer.

2. The method of claim 1 wherein said manganese oxide-forming solution of $Mn(NO_3)_2$—$Mn(OH)_2$—$NH_4NO_3$—$H_2O$ system includes a colloid stabilizing agent.

3. The method of claim 2 wherein said colloid stabilizing agent is crystalline cellulose.

* * * * *